(12) United States Patent
Moussa

(10) Patent No.: US 8,500,287 B2
(45) Date of Patent: Aug. 6, 2013

(54) PROJECTION UNIT HAVING SPECKLE SUPPRESSION DEVICE BASED ON PIEZOELECTRIC ACTUATING

(75) Inventor: Hassan Moussa, Illkirch (FR)

(73) Assignee: Delphi Technologies, Inc., Troy, MI (US)

( * ) Notice: Subject to any disclaimer, the term of this patent is extended or adjusted under 35 U.S.C. 154(b) by 535 days.

(21) Appl. No.: 12/630,066

(22) Filed: Dec. 3, 2009

(65) Prior Publication Data

US 2010/0141898 A1 Jun. 10, 2010

(30) Foreign Application Priority Data

Dec. 10, 2008 (EP) .................................... 08171221
Mar. 5, 2009 (EP) .................................... 09154420

(51) Int. Cl.
*G03B 21/14* (2006.01)
(52) U.S. Cl.
USPC .................. 353/38; 349/11; 353/13; 353/46; 353/69
(58) Field of Classification Search
USPC .................. 353/38, 46, 69, 13; 359/452, 454, 359/459, 198.1, 599, 13; 349/11
See application file for complete search history.

(56) References Cited

U.S. PATENT DOCUMENTS

| 3,941,456 | A  | * | 3/1976 | Schilz et al. ................ 359/305 |
| 7,956,941 | B2 | * | 6/2011 | Khan .............................. 349/33 |
| 7,969,644 | B2 | * | 6/2011 | Tilleman et al. .............. 359/298 |
| 2003/0039036 | A1 | * | 2/2003 | Kruschwitz et al. .......... 359/707 |
| 2006/0092515 | A1 | * | 5/2006 | Kim et al. ...................... 359/566 |
| 2006/0215244 | A1 | * | 9/2006 | Yosha et al. .................... 359/15 |
| 2007/0103747 | A1 | * | 5/2007 | Powell et al. .................. 359/13 |
| 2008/0198334 | A1 | * | 8/2008 | Kasazumi et al. ............ 353/38 |
| 2009/0201589 | A1 | * | 8/2009 | Freeman ....................... 359/630 |
| 2010/0220299 | A1 | * | 9/2010 | Mizushima et al. ........... 353/38 |
| 2011/0037953 | A1 | * | 2/2011 | Nizani et al. .................. 353/38 |

FOREIGN PATENT DOCUMENTS

| EP | 1328128 | 7/2003 |
| EP | 1510851 | 3/2005 |
| EP | 1655636 | 5/2006 |
| GB | 2456170 | 7/2009 |
| JP | 2008134269 | 6/2008 |
| WO | 2005054929 | 6/2005 |
| WO | 2007035905 | 3/2007 |

* cited by examiner

*Primary Examiner* — Georgia Y Epps
*Assistant Examiner* — Kevin Wyatt
(74) *Attorney, Agent, or Firm* — Thomas N. Twomey

(57) ABSTRACT

A projection unit comprising a coherent light source such as a laser diode and a beam shaping element forming a light beam which is directed towards a display, characterized in that it comprises a laser speckle suppression device which is positioned between the laser source and the display and wherein the laser speckle suppression device is a diffusing element actuated randomly by a piezoelectric vibrating structure.

11 Claims, 3 Drawing Sheets

PROJECTION UNIT HAVING SPECKLE SUPPRESSION DEVICE BASED ON PIEZOELECTRIC ACTUATING

TECHNICAL FIELD

The present invention relates to a laser based projection unit for diffractive head up display having a laser speckle suppression device based on piezoelectric actuating.

BACKGROUND OF THE INVENTION

Diffractive head up displays use coherent type light source in order to illuminate a display, and then to project a virtual image through a diffractive combiner. The usage of diffractive technology in this kind of application implies a necessity to have an adapted projection unit able to interact correctly with the diffractive combiner especially concerning the image quality.

The phenomenon of speckle appears when we illuminate a display or a naturally rough surface with a light spatially and temporally coherent as the light generated by a laser source. This phenomenon can be useful for certain applications such as measuring deformation of objects. But in other applications such as projection systems, including those associated with head-up display application using diffractive components, the suppression of this phenomenon is very important to improve the quality of the virtual image perceived by user.

As mentioned above, the statistical properties of the speckle generally depend from one hand on the coherence of the incident beam and on the other hand on the diffused mediums crossed by the light beam. In a projection system, including systems used in head-up display based on diffractive elements, the average size of speckle depends also on the optical system used after the display (lens, diffractive combiner and in some cases human eye).

Up to today, almost all the currently patented speckle reduction devices uses complex optical systems and requires precise adjustments that can not be easily implemented for industrial application. We cite for example U.S. Pat. No. 4,155,630; US2008/0055698A1; WO 00/65401 and EP1257869 B1, U.S. 2009/0231720A1, all of which are incorporated herein by reference.

All these are based on averaging of phase (case of U.S. Pat. No. 4,155,630; US2008/0055698A1 and) using rocking motion of a mirror; or on averaging the polarization of the light beam (case of EP1257869 B1). In all cases the usage of minors presents many limitations:

- The application of a movement of translation or tilting on the minor involves only a translation of wave front. In other words the averaging is done on several identical shifted wave fronts, this averaging reduces slightly the speckle but has no effect on the uniformization of the beam.
- The usage of minors requires a very precise control to create a movement profile of movement adapted to averaging;
- The most important weakness of mirror based solution is that this solution is available only for a speckle characterised by small amplitude.

The purpose of the present invention is to give a solution to all the above described limitations of speckle reduction devices, by proposing a simple and small instrument for speckle reduction that can be integrated in any projection system without any need to modify the optical design of the projection system. Also the purpose of the present invention is a laser based projection system having the proposed speckle suppression device.

SUMMARY OF THE INVENTION

The present invention proposes a projection unit for diffractive head up display comprising a coherent light source such as a laser diode and a beam shaping element forming a light beam which is directed towards a display, characterized in that it comprises a laser speckle suppression device which is positioned between the laser source and the display and wherein the laser speckle suppression device is a diffusing element actuated randomly by a piezoelectric vibrating structure.

BRIEF DESCRIPTION OF THE DRAWINGS

The present invention is now described by way of example with reference to the accompanying drawings in which.

DESCRIPTION OF THE PREFERRED EMBODIMENTS

The speckle suppression device presented in the invention is based on moving directly a diffusing medium according to a composite vibration mode. This composite vibration mode (for example bending+rotation or +shearing) associated with the structural features of the diffuser will enable to generate for each position of the diffuser a corresponding wavefront and thus a special speckle noise. The averaging of these wavefronts will enable a real random spatial phase averaging, which can reduce the speckle, whatever its magnitude, and at the same time to correct the uniformity of the beam.

Figure 1:
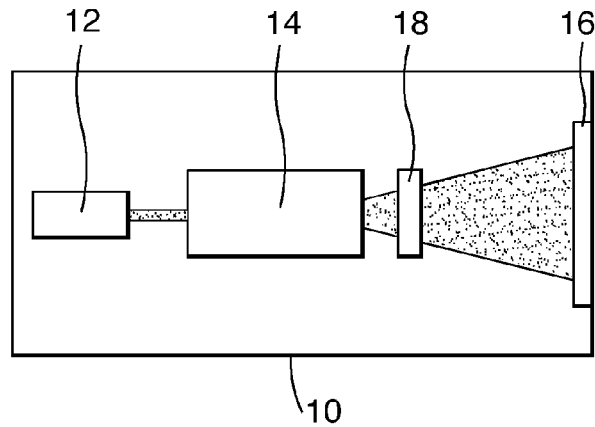
FIG. 1 is a schematic view showing a projection unit comprising a laser speckle suppression device according to the invention.

As can be seen on FIG. 1, the projection unit 10 is constituted of a laser type source 12 generating a coherent light beam, a beam shaping element 14 (diffractive or not) and a display 16. A laser speckle suppression device 18 is positioned between the laser source 12 and the display 16.

Figure 2:
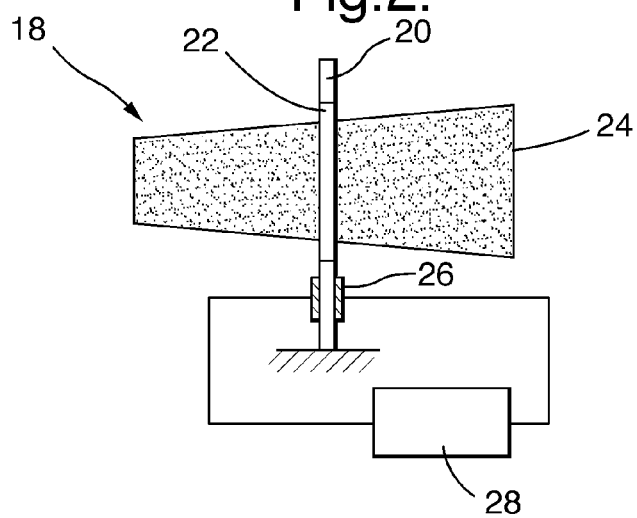
FIG. 2 is a schematic view showing a first embodiment of the laser speckle suppression device of FIG. 1.
Figure 3:
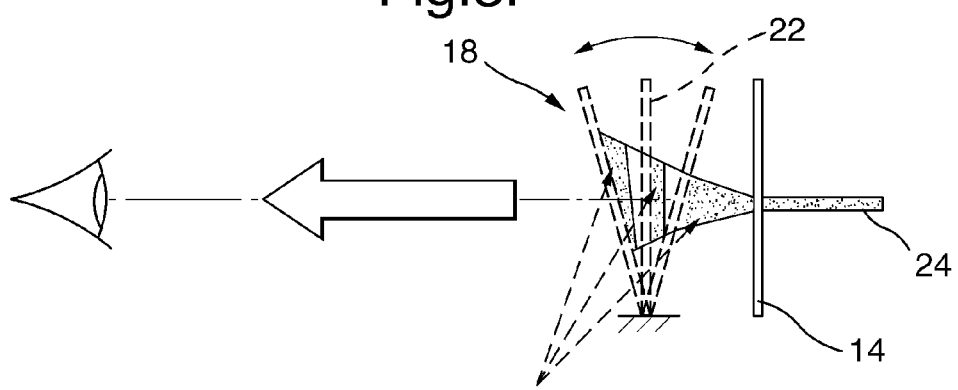
FIG. 3 is a schematic view showing how the laser speckle suppression device of FIG. 2 is working.

In a first embodiment of the laser speckle suppression device 18, as shown on FIG. 2, the laser speckle suppression device 18 is constituted of a vibrating metallic structure 20 on which an optical diffusing element 22 is fixed through which the laser beam 24 passes. Piezoelectric plates 26 are fixed on the vibrating structure 20. An electronic oscillating circuit 28 is designed to drive the vibrations in the piezoelectric elements at the desired frequency and at the desired vibration mode. This method enables to apply directly a vibrating movement to the diffusing element 22.

Figure 4:
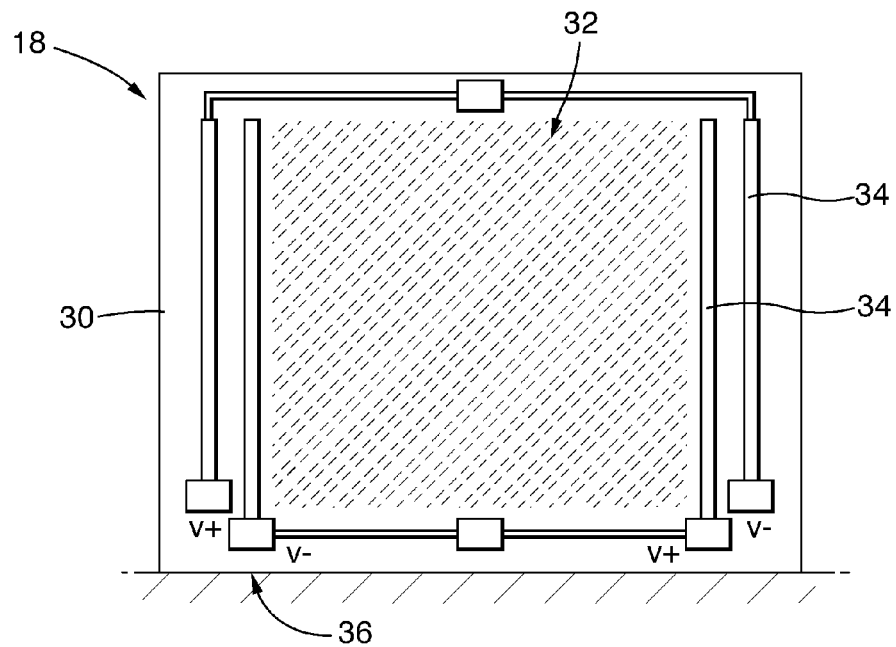
FIG. 4 is a schematic view of a second embodiment of the laser speckle suppression device of FIG. 1.
Figure 5:
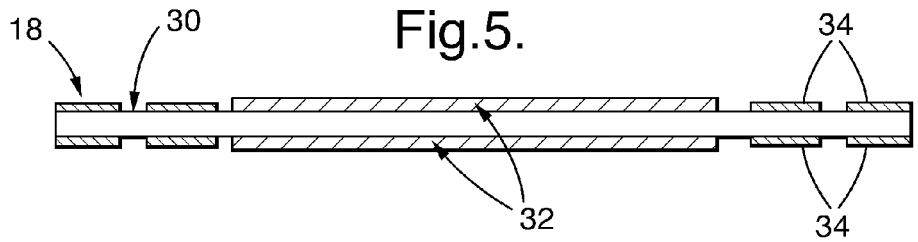
FIG. 5 is a cross section view showing the second embodiment of the laser speckle suppression device.
Figure 6:
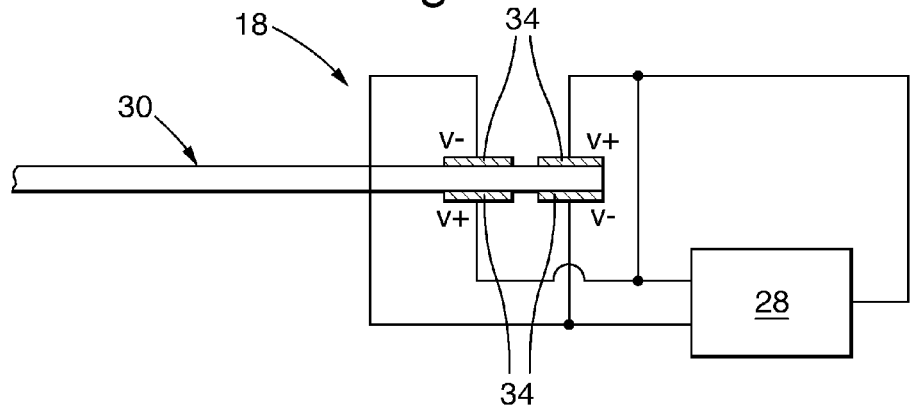
FIG. 6 shows the electrical configuration of the second embodiment of the laser speckle suppression device.

In a second embodiment of the laser speckle suppression device 18, as shown on FIGS. 4 to 6, the laser speckle suppression device 18 is constituted of a quartz plate 30 on which a diffusion layer 32 is deposited. Electrodes 34 are directly deposited on the quartz plate surfaces. These electrodes 34 are used in order to generate the required vibrating modes at the required frequency. The quartz plate is fixed for example on a support surface 36 on the electronic PCB including the driving electronics 28. This embodiment uses directly the piezoelectric properties of the quartz in order to generate the required vibrating modes at the desired frequency, and enables a simple integration with the associated driving electronics 28. Also the optical characteristics of the quartz plate 30 (transparent material with a refraction index about 1.458) enable to use it directly for both functions: optical function and piezoelectric function. Also in this version the speckle is reduced due to the random averaging of the phase, and also the uniformization of the beam is obtained.

For both embodiments of the laser speckle suppression device 18, the electronic circuit 28 is designed in order to assure the vibration of the structure at the required vibration frequency. In fact, this frequency is related to the chosen vibrating mode.

As explained above the vibration of the diffusing element 22 randomly averages the image and thus reduces the speckle by virtually creating a mean value of the laser wavelength. Generally it is enough to drive the vibration at a frequency higher than that of the human eye sensitivity with sufficient amplitude. The random vibrations at that frequency will enable the eye to see a mean value of the images superposed on the diffusing element 22. As the piezoelectric actuating according to the present invention is specifically designed to generate the composite vibration mode at the desired frequency and amplitude, the frequency is chosen with respect to the eye sensitivity criterion and to comfort requirements (no audible noise is generated by the device).

This kind of projection systems 10 having such speckle suppression device 18 can be suitable for application such as head up displays based on diffractive (or holographic) combiners. In such kind of head up displays, it is necessary to reduce the speckle effect in order to improve the quality of the virtual image. In fact the speckle effect is generally magnified by the diffractive combiner.

Figure 7:
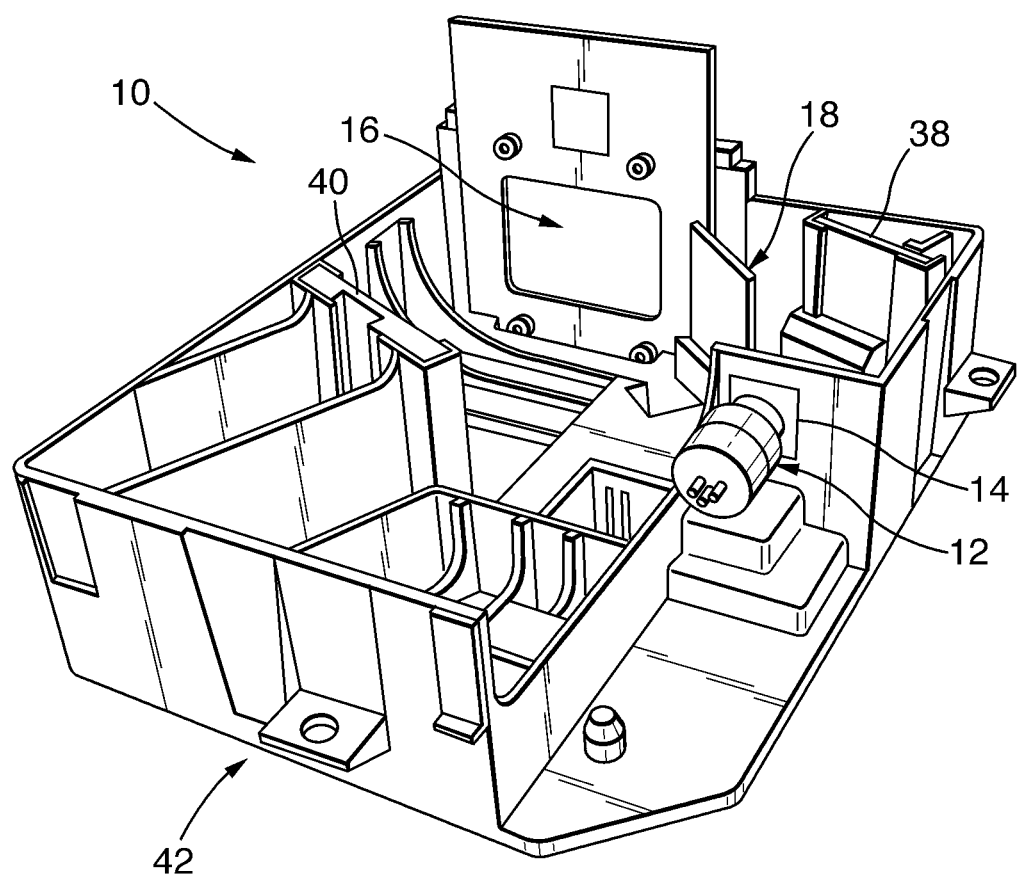
FIG. 7 shows a projection unit incorporated in a diffractive head up display and using the speckle suppression device according to FIG. 2.

According to the present invention, the projection unit 10 for the diffractive head up display 42 presented on FIG. 7, comprises a laser source 12, a diffractive beam shaping element 14, two mirrors 38, 40, and a display 16. The diffractive beam shaping element 14 is designed to obtain a light spot having the same shape and dimensions as the display 16 with a high uniformity and a high energetic efficiency. The laser speckle suppression device 18 shown corresponds to the first embodiment of the invention. The laser speckle suppression device 18 can be easily integrated within the projection unit 10 and within the head up display 42 without any need to modify the optical design initially defined.

U.S. Pat. No. 4,155,630; US2008/0055698A1; WO 00/65401; EP1257869 B1; US2009/023172; and U.S. Pat. No. 6,317,169 B1 are hereby incorporated herein by reference.

The invention claimed is:

1. A projection unit comprising:
   a coherent light source that produces light;
   a beam-shaping element that receives said light and forms a light beam;
   a laser speckle suppression device that includes a diffusing element that is randomly activated by a vibrating structure, and the diffusing element receives said light beam directly from the beam-shaping element, and the laser speckle suppression device produces a light beam output;
   a display that receives said light beam output directly from said laser speckle suppression device; and
   a metallic structure with the diffusing element disposed therein, the metallic structure configured for rotational displacement in relation to an axis defined along the received light beam so that said light beam output contains different wave fronts with different speckle characteristics associated with a display image produced on the display.

2. The projection unit of claim 1, wherein the metallic structure has a composite vibration movement that includes a pivoting movement of the diffusing element in a direction along said axis that is generally transverse to said axis and in a plurality of other directions that have a plurality of angles of rotations, respectively, in relation to said transverse direction.

3. The projection unit of claim 1, wherein the laser speckle suppression device includes, a pair of piezoelectric plates fixedly opposingly disposed on the metallic structure, said plates being disposed on said laser speckle suppression device remote from the diffusing element.

4. The projection unit of claim 3, wherein the pair of piezoelectric plates are in electrical communication with an electronic oscillating circuit mounted on a printed circuit board said electronic oscillating circuit being operative to electrically drive the piezoelectric plates to control said rotational displacement of the metallic structure at a vibration frequency and a vibration mode.

5. A projection unit comprising:
   a coherent light source that produces light;
   a beam-shaping element that receives said light and forms a light beam;
   a laser speckle suppression device that includes a diffusing element that is randomly activated by a vibrating structure, and the diffusing element receives said light beam directly from the beam-shaping element, and the laser speckle suppression device produces a light beam output;
   a display that receives said light beam output directly from said laser speckle suppression device; and
   a quartz plate having an exterior surface, said exterior surface including a diffusion layer disposed thereon.

6. The projection unit of claim 5, wherein the exterior surface of the quartz plate is a first exterior surface and the quartz plate has a second exterior surface having a parallel, spaced relationship to the first exterior surface, and the diffusion layer is a first diffusion layer and the quartz plate includes a second diffusion layer disposed on the second exterior surface opposite the first diffusion layer.

7. A projection apparatus for a vehicle having a windshield positioned for reflection of a display image off a windshield surface into a vehicle operator's line-of-sight, said apparatus comprising:
   a laser diode operative to provide a source of coherent light;
   a beam-shaping element operative to transform said coherent light into a laser light beam, and directing said laser light beam toward said display; and
   a laser speckle suppression device disposed intermediate said beam-shaping element and said display and directly receiving said laser light beam from the beam-shaping element and said laser speckle suppression device produces a light beam output,
   a display that receives said light beam output directly from said laser speckle suppression device, and said laser speckle suppression device includes, a substantially transparent quartz plate disposed generally normally to and in register with said laser light beam, a diffusion layer deposited on a surface of said quartz plate, a rigid metallic frame structure configured to support said quartz plate as a cantilever for reciprocating displacement about an axis orthogonal to said laser light beam, at least one piezoelectric plate fixed to the rigid frame structure and/or the quartz plate, and an electronic oscillator in-circuit with said at least one piezoelectric plate, said oscillator operative to selectively energize said piezoelectric plate and thereby effect vibration of said quartz plate and the rigid frame structure at a desired frequency and a desired vibration mode.

8. The projection apparatus of claim 7, wherein said laser speckle suppression device is pivotally attached at one end of said laser speckle suppression device to a support surface and a printed circuit board is also disposed on the support surface and comprises said electronic oscillator.

9. The projection apparatus of claim 7, wherein the projection apparatus further includes, a housing structure with said projection apparatus disposed therein, said housing structure further being disposed in the vehicle.

10. The projection apparatus of claim 9, wherein the projection apparatus is disposed in the housing structure in a manner such that at least one of, (i) said coherent light,
(ii) said laser light beam, and
(iii) said light beam output travels in at least a first light path and a second light path and a third light path from the laser diode to the display within the housing structure.

11. The projection apparatus of claim 10, wherein the projection apparatus further includes, a first mirror and a second mirror respectively disposed in the housing structure, and the first light path is defined from the light diode through the beam-shaping element to the first mirror, the second light path is defined from the first mirror through the laser speckle suppression device to the second minor, and the third light path is defined from the second mirror directly to the display, wherein the first path has a generally parallel, spaced relationship with the third path and the second path has a different relationship from said parallel, spaced relationship.

* * * * *